Aug. 4, 1970            B. A. BABB            3,522,473

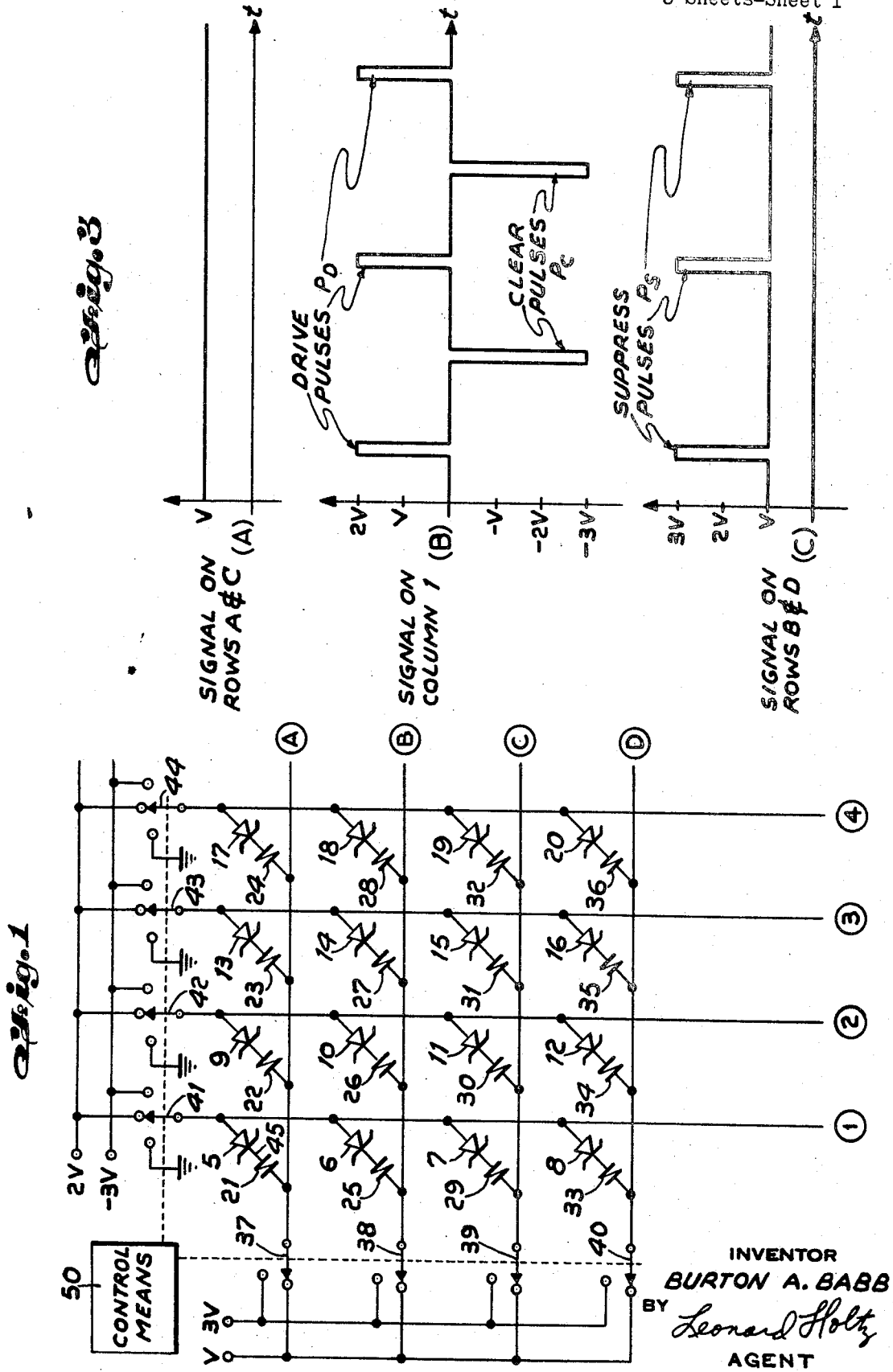

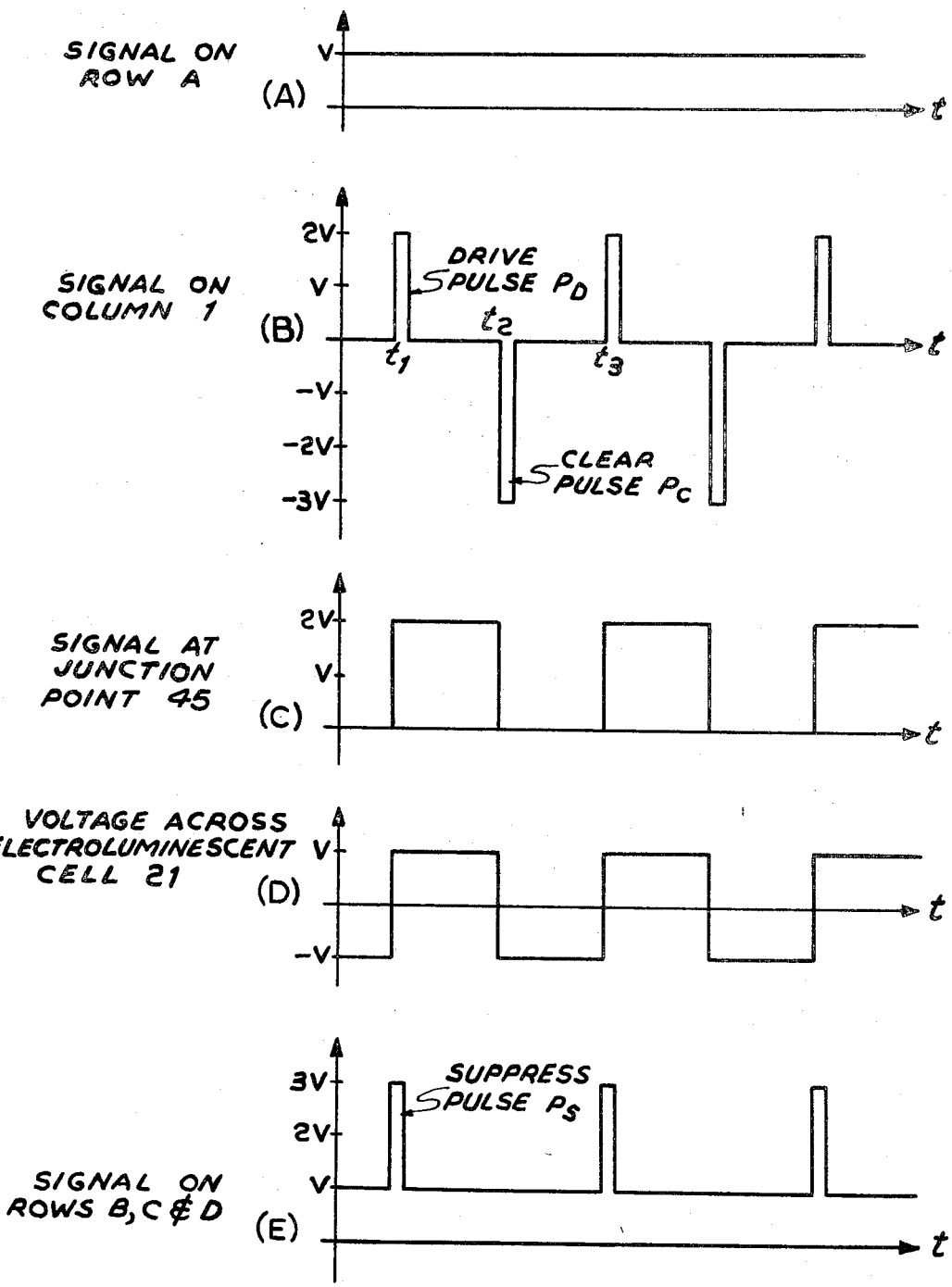

ELECTROLUMINESCENT DISPLAY UTILIZING VOLTAGE BREAKDOWN DIODES

Filed Dec. 26, 1967            3 Sheets-Sheet 3

INVENTOR
BURTON A. BABB
BY Leonard Holtz
AGENT

United States Patent Office 3,522,473
Patented Aug. 4, 1970

3,522,473
ELECTROLUMINESCENT DISPLAY UTILIZING VOLTAGE BREAKDOWN DIODES
Burton A. Babb, Fort Wayne, Ind., assignor to International Telephone and Telegraph Corporation, Nutley, N.J., a corporation of Delaware
Filed Dec. 26, 1967, Ser. No. 695,313
Int. Cl. H05b 37/00, 39/00
U.S. Cl. 315—169                    9 Claims

ABSTRACT OF THE DISCLOSURE

An electroluminescent display system utilizing a voltage breakdown diode (such as Zener diodes) in series with each electroluminescent cell in an array and wherein DC voltage sources and simple switching apparatus are utilized to apply an effective AC excitation voltage to selected electroluminescent cells in the array. The voltage breakdown diodes serve to enable each electroluminescent cell to store a charge thereon for predetermined periods of time and to provide a discharge path for each electroluminescent cell responsive to a control signal.

FIELD OF THE INVENTION

This invention relates to electroluminescent display systems and more particularly to a novel electroluminescent display system, utilizing voltage breakdown diodes, which exhibits a storage characteristic and wherein a discharge path is provided for each electroluminescent cell.

DESCRIPTION OF THE PRIOR ART

Displays consisting of matrix-type arrays of electroluminescent cells which utilize non-linear impedances in series with each electroluminescent cell are well known in the art. In some applications, for example, at low speeds or scan rates, these prior art display systems provide adequate operational characteristics. But, since the resistances of the non-linear impedances are substantial, it takes a substantial period of time to charge the electroluminescent cell which is coupled in series therewith. This period of time is usually too long to be tolerated in a high speed display system. Also, the "off" impedances of the non-linear impedances are relatively low and therefore voltage which is stored in the electroluminescent cell will leak off at a substantially high rate through the impedance. Again, where low scan rates are used, this leakage is tolerable and is ignored.

In large electroluminescent matrix-type arrays, in which columns (and/or rows) are periodically scanned in a sequential manner, each column (and/or row) can only be driven for a small portion of the overall scan time. For example, in a 1,000 column matrix, each column would be driven "on" for a .1% duty cycle. Electroluminescent cells do not provide optimum contrast ratios and brightness characteristics when operating at such low duty cycles. It would be much more desirable if means were provided whereby an electroluminescent cell could be pulsed "on," the charge on the electroluminecent cell stored for a predetermined period of time, and the electroluminescent cell then discharged responsive to another signal to thereby turn the cell "off" at the desired instant of time. In this manner high scan rates can be achieved while the electroluminescent cells "see" a high duty cycle AC excitation voltage.

SUMMARY OF THE INVENTION

Therefore, the main object of this invention is to provide a novel electroluminescent cell display system which enables a charge to be stored on an electroluminescent cell and to then be controllably discharged, thereby providing high duty cycle operation for selected electroluminescent cells in a high speed display system.

A further object of this invention is to provide such an electroluminescent display system which utilizes DC sources and simple switching apparatus to effectively provide AC excitation for the electroluminescent cells.

According to this invention, an electroluminescent display unit includes first and second voltage sources, an electroluminescent cell, and a voltage breakdown diode coupled in series with the electroluminescent cell. Means are provided for coupling the first voltage source to a free end of the series combination of the electroluminescent cell and the voltage breakdown diode and for coupling the second voltage source to the other free end of the series combination. The voltage breakdown diode serves to allow the electroluminescent cell to store the charge impressed thereon and also provides a discharge path for selectively discharging the electroluminescent cell.

BRIEF DESCRIPTION OF THE DRAWINGS

FIG. 1 is a schematic diagram of a portion of an array of electroluminescent display units according to this invention;

FIG. 2 is an illustration of the voltages appearing at designated points in FIG. 1;

FIG. 3 is an illustration of waveforms for lighting specified electroluminescent cells in the array of FIG. 1;

DESCRIPTION OF THE PREFERRED EMBODIMENTS

Figure 4:
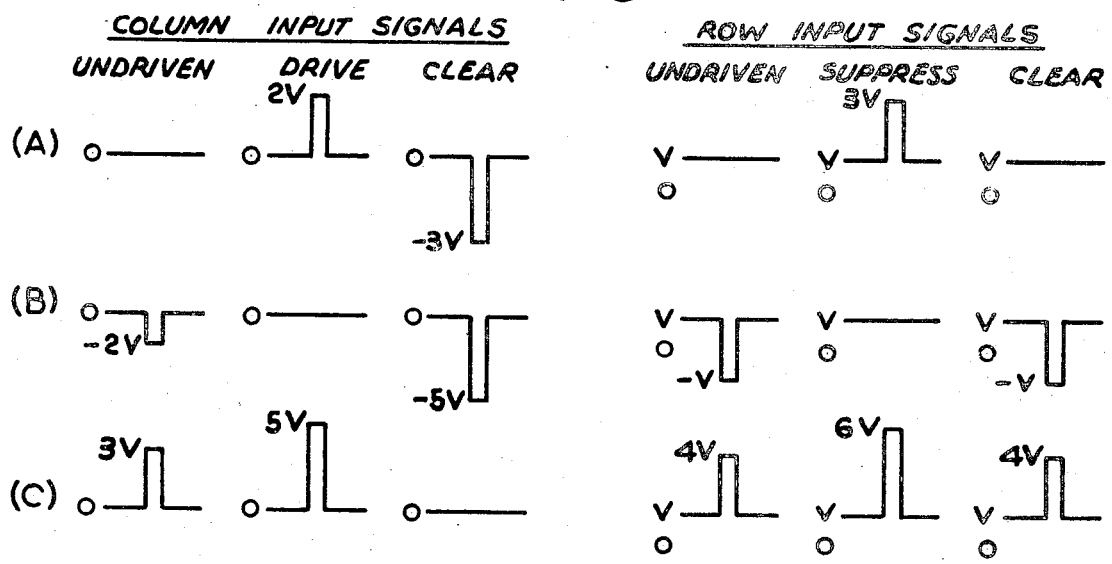
FIG. 4 illustrates various other input pulse combinations for operating an electroluminescent display unit according to the invention.

Referring to FIG. 1, there is shown a 4 x 4 matrix array of electroluminescent cells according to this invention. It is pointed out that the 4 x 4 matrix illustrated therein is shown only by way of example and it should be clear to one ordinarily skilled in the art how such a matrix may be expanded within the spirit of this invention to any desired size. The row conductors A, B, C and D are coupled to switches 37, 38, 39 and 40, respectively. One contact of each switch is coupled to a first voltage source of value V and the other contact of each switch is coupled to a second voltage source of value 3V. The column conductors 1, 2, 3 and 4, shown orthogonally oriented with respect to the row conductors, are coupled to switches 41, 42, 43 and 44, respectively.

One contact of each switch 41–44 is coupled to ground potential, one contact to a third voltage source of value 2V volts and one contact to a fourth voltage source of value —3V volts. Coupled to switches 37–44 is a control means 50 for selectively operating said switches to desired contact positions for predetermined periods of time. Such control means are presently known in the art and a detailed description thereof is deemed unnecessary for a proper understanding of the instant invention. At the cross-point of row conductor A and column conductor 1, there is coupled the series combination of a Zener diode 5 and an electroluminescent cell 21. At the cross-point between the row conductor A and column 2 there is coupled the series combination of a Zener diode 9 and an electroluminescent cell 22. Likewise, series combinations of Zener diodes and electroluminescent cells are similarly coupled at all of the cross-points between the row and column conductors A–D and 1–4, respectively.

The mechanical switches 37–44 shown in FIG. 1 are shown merely by way of example and it should be clear that many other types of switching means presently known in the art may be substituted therefor within the spirit of the invention. For example, semiconductor switches controlled by appropriate control means may be used. Also, the voltages of magnitude V, 2V, 3V and —3V are given only by way of example and it will be clear in view of the following operational description of the invention that many other combinations may be used.

Also, for best operation of the system shown in FIG. 1, the voltage breakdown values of the Zener diodes 5–20 should be substantially equal. If this is not so, non-uniform switching operation may result and there will occur varying degrees of brightness throughout the display system. Zener diodes which meet the system requirements are readily available in the art and hence, this limitation is of no practical consequence.

Also, it is pointed out that Zener diodes are shown only by way of example. Any circuit element having a "voltage breakdown" characteristic would be suitable for this application.

The operation of the embodiment illustrated in FIG. 1 will now be described in detail with reference to the waveforms of FIG. 2. In this particular example, it will be assumed that the Zener diodes all have a breakdown of voltage of approximately —3V volts.

In order to more clearly understand the features of this invention, the operation of the cross-point element corresponding to the cross-point of row A and column 1 (which includes diode 5 and electroluminescent cell 21) will be discussed in detail without considering the other cross-points. Assume that the voltage on row conductor A is held at V volts by means of switch 37 and that the voltage on column conductor 1 is held at 0 volts by means of switch 41 being in its grounded position. In the steady state, if the leakage of the Zener diode 5 is greater than the leakage of the electroluminescent cell 21, the voltage at point 45 (the junction of the electroluminescent cell 21 and Zener diode 5) will be 0 volts, thereby placing a D.C. bias of —V volts across the electroluminescent cell 21. But, however, if the leakage of the electroluminescent cell 21 is greater than that of the Zener diode 5, the voltage at point 45 will be at V volts and the electroluminescent cell 21 would have a zero D.C. bias. In either case, if the voltage on column 1 is momentarily switched to 2V volts by means of control means 50 momentarily operating switch 41 to the 2V position, the voltage at point 45 will also rise to 2V volts and the D.C. bias across the electroluminescent cell 21 will be V volts. This condition is shown occurring at time $t_1$ in the waveforms shown in FIGS. 2A, B, C and D. The voltage pulse $P_D$ of magnitude 2V (FIG. 2B) which is applied to column conductor 1 via switch 41 need only be momentary and may be removed as soon as the voltage at point 45 reaches 2V volts. Typically, the time duration of pulse $P_D$ may be 10 microseconds. The charge on the electroluminescent cell 21 will remain thereon since the Zener diode 5 is now reverse biased at a voltage below its breakdown voltage. The only source of loss is now in the internal leakage of the electroluminescent cell 21 which will cause the cell to lose some of its charge at a very low rate of discharge.

If now the column conductor 1 is pulsed with a voltage pulse $P_C$ (FIG. 2B) of magnitude —3V volts, the Zener diode 5 will now be reverse biased above its voltage breakdown value and will provide a low impedance discharge path for the electroluminescent cell 21, thereby causing the voltage at junction point 45 to return to 0 volts and the D.C. bias across the electroluminescent cell 21 to go to —V volts. It is pointed out that the duration of the negative pulse $P_C$ of magnitude —3V volts applied to column conductor 1 need only be very short since the time duration thereof need only be long enough to enable the electroluminescent cell 21 to discharge. This time requirement is very short since the discharging is accomplished via the low impedance path that is provided by the reverse biased Zener diode, which is reverse biased beyond its reverse breakdown value. The voltage pulse $P_C$ of magnitude —3V volts which results in the D.C. bias across the electroluminescent cell 21 returning to —V volts is shown in FIG. 2 as occurring at the time $t_2$ and is hereafter called the "clear" pulse.

It is noted that in the above discussion of the operation of the crosspoint consisting of Zener diode 5 and electroluminescent cell 21, the effects of the voltage pulses on the electroluminescent cells in the other associated crosspoints have been ignored. This was merely for ease of explanation of the operation of the basic display unit according to the invention and a more detailed discussion of the operation of the matrix as a whole appears below.

The effect of the waveforms of 2A and 2B on the rest of the cross-points of the matrix of FIG. 1 will now be considered. If it is desired to light only the electroluminescent cell in the cross-point comprising Zener diode 5 and electroluminescent cell 21, ground potential is supplied to columns 2, 3 and 4 and at time $t_1$ when the positive drive pulse $P_D$ of magnitude 2V volts is applied to column 1 (FIG. 2B), a "suppress pulse," such as pulse $P_S$ of FIG. 2E, of magnitude 3V volts must be applied to the row conductors associated with the cross-points that are to remain extinguished. This suppress pulse and drive pulse combination raises the voltage on both sides of the electroluminescent cells that are to remain extinguished by the same amount of voltage, thereby maintaining the voltage thereacross constant throughout the pulsing cycle.

The application of the suppress pulse $P_S$ of FIG. 2E to rows B, C and D, have no effect on the electroluminescent cells associated with the row conductors B, C and D since the Zener diodes associated with said electroluminescent cells are all back-biased below their reverse voltage breakdown value by virtue of the fact that the suppress pulse $P_S$ has a magnitude equal to but not more than the said reverse breakdown voltage. Therefore, with the application of the voltage of FIG. 2A and the pulses $P_D$, $P_C$ and $P_S$ shown in FIGS. 2B and 2E, the electroluminescent cell 21 will be lit, and the electroluminescent cells 22, 23 and 24 will be maintained extinguished since there was no change in the voltages applied thereacross. Electroluminescent cells 25, 29 and 33 will remain extinguished because the voltage applied to both sides thereof was equal in magnitude and therefore the voltage thereacross remained constant. Electroluminescent cells 26–28, 30–32 and 34–36 will remain extinguished due to the fact that their associated Zener diodes remained reverse biased below their reverse breakdown voltage during the application of the suppress pulse $P_S$ and therefore, act merely as blocking diodes to prevent the voltage across said electroluminescent cells 26–28, 30–32 and 34–36 from changing. Therefore, it is seen by means of the application of the signals illustrated in FIGS. 2A, 2B and 2E, the only electroluminescent cell that will be illuminated in the array of FIG. 1 is electroluminescent cell 21 which is associated with the crosspoint defined by column 1 and row A.

If, on the other hand, it is desired to illuminate the electroluminescent cells 21 and 29, then ground potential is applied to columns 2, 3 and 4 and the waveforms illustrated in FIGS. 3A, 3B and 3C are applied to the designated row and column conductors. In this case, the suppress pulses $P_S$ of FIG. 3C, which are identical to the suppress pulse $P_S$ of FIG. 2E, are applied only to rows B and D, a constant voltage V is applied to rows A and C, and the drive pulses $P_D$ of FIG. 3B are applied to column 1. The values of the voltages at the various points in the array should be apparent to one ordinarily skilled in the art in view of the above discussion of FIGS. 1 and 2.

Since it only takes a few microseconds or less to charge any particular electroluminescent cell, the width (or time duration) of the "drive" pulse (such as pulse $P_D$ of FIG. 2B) applied to any appropriate column conductor need only be approximately 5 or 10 microseconds.

As previously stated, this is because the charging of the electroluminescent cells is accomplished through a single forward biased diode. Since a Zener diode is being used, each charged electroluminescent cell will stay charged as long as the reverse bias on its associated Zener diode remains below its breakdown voltage. At any time, the charge on all of the electroluminescent cells in a given column can be removed by setting their D.C. biases at −V volts (i.e. plus V volts on the row side and 0 volts on the column side of the electroluminescent cell) by momentarily pulsing the appropriate column conductor to a negative voltage equal in magnitude to the breakdown voltage of the Zener diodes. This pulse is represented by the "clear" pulse of magnitude −3V volts appearing at the time $t_2$ in the waveform of FIGS. 2B and 3B. During the application of the clear pulses, the associated electroluminescent cell is discharged through the low impedance provided by the reverse biased Zener diode.

From the above, it should be clear that many different combinations of drive, suppress and clear pulses may be utilized in an electroluminescent array according to this invention. For example, it would not affect operation of the system to superimpose any given waveshape on all of the inputs or to apply some of the clear pulses to the row conductors instead of to the column conductors. These variations should be recognized by one ordinarily skilled in the art.

In FIG. 4, there is shown three different combinations of drive, clear and suppress pulses which may be applied to the appropriate row and column conductors. The combination of signals shown in FIG. 4A is the same as utilized in the above described example with reference to FIG. 1, the combination shown in FIG. 4B uses all negative pulses, and the combination shown in FIG. 4C utilizes all positive pulses. In view of the above detailed description of this invention, the operation of the matrix of FIG. 1 with the applied waveform of FIGS. 4B and 4C should be clear to one ordinarily skilled in the art. Therefore a more detailed description of the system in conjunction with FIGS. 4B and 4C is deemed unnecessary for a proper understanding of this invention.

Figure 5:
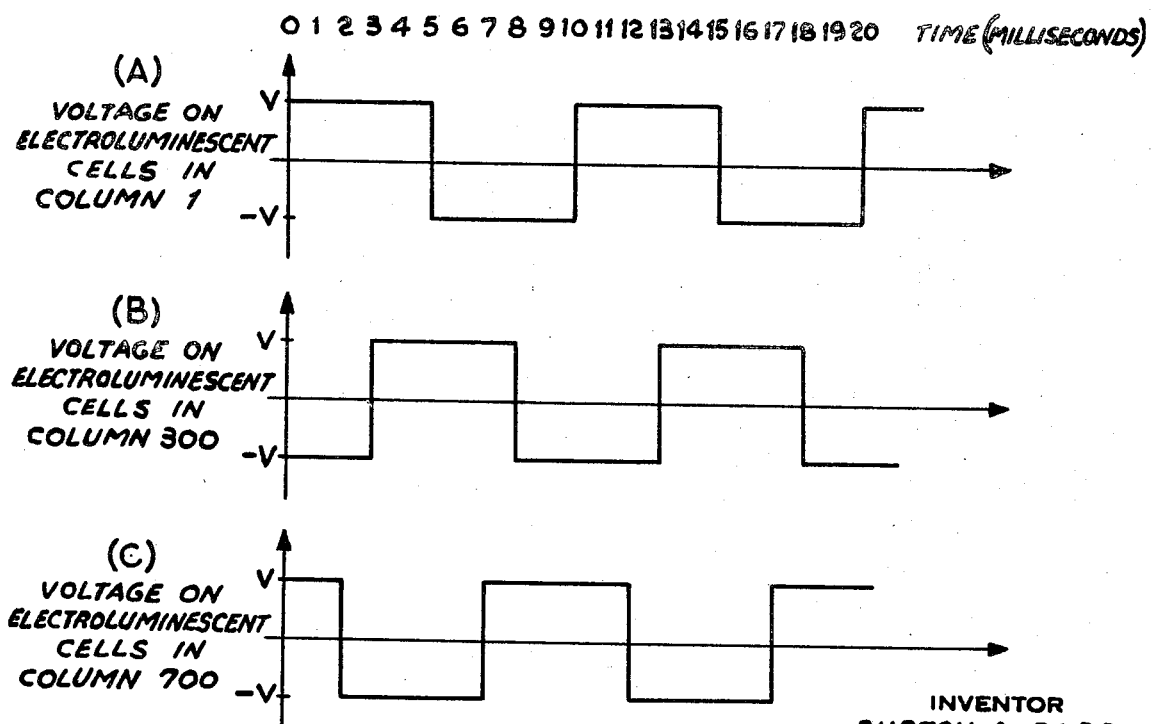
FIG. 5 is an illustration of the waveforms appearing across designated electroluminescent cells in a large array according to the invention.

In a typical array of one thousand rows and one thousand columns, having one million ($10^6$) electroluminescent cells and one million ($10^6$) Zener diodes, the Zener diodes are all chosen to have a reverse breakdown voltage of one thousand volts, for example. The drive pulses could be 5 microseconds long and every 10 microseconds a new column could be driven. A suitable combination of drive, suppress and clear pulses to charge the desired electroluminescent cells should be used. Five milliseconds after a column has been driven (i.e. one-half a frame later) it could be cleared during the five microsecond inactive period between the application of drive pulses on the other columns. The voltages applied to the rows and columns could be similar to those shown in FIGS. 2A, 2B and 2E, where the voltage V is approximately equal to 333 volts. In such a case, the voltage across the electroluminescent cells is representative columns would be as shown in FIG. 5. The waveform applied to each representative column is as shown in FIG. 2B except that the columns are sequentially pulsed to scan the display. If a constant voltage of V volts is applied to all of the rows during the scan, the voltages across each electroluminescent cell in the driven columns will be as shown in FIGS. 5A–5C which represent the voltages across the cells in columns 1,300 and 700. It should be clear what the voltages across other cells in the array should be, depending upon the signals applied to the associated rows and columns.

It is again pointed out that the voltage across a driven electroluminescent cell in a configuration according to this invention is a square wave. This type of excitation signal provides the most light output from an electroluminescent cell at a given frequency and for a given applied voltage. The effective duty cycle for each electroluminescent cell in the above-described 1000 x 1000 array would be 100% even though the information transferred to any particular electroluminescent cell takes place at a .05% duty cycle. Furthermore, in the above typical example, 2000 switches (or electronic gates) are controlling one million ($10^6$) electroluminescent cells at frame rates which are relatively high. Such an array would be more than adequate for either black and white or color television.

Some of the advantages of the above described electroluminescent display over the prior art displays are as follows:

(1) Only one component, a voltage breakdown diode, such as a Zener diode, is used with each electroluminescent cell. These diodes are relatively inexpensive electronic components and are readily fabricated into large arrays.

(2) A high voltage Zener diode can be fabricated having a total capacitance of less than 0.2 picofarad. Since this capacity will determine the contrast ratio and power consumption of the overall array, the use of such a component which can be designed to have such a low capacity is highly advantageous.

(3) The best life for a given light output is achieved by an electroluminescent cell when it is driven with a square wave, and for any given drive voltage magnitude and frequency, the most light output is supplied by an electroluminescent cell driven by a square wave. Also, since each cell is provided with its own discharge path, non-leaky diodes and non-leaky electroluminescent cells will provide the most favorable performance since higher efficiencies result.

(4) The basic storage, or pulse stretching, is performed in a controlled manner by means of the short duration drive and clear pulses. The pulses are stored for a controlled period of time in the electroluminescent cell substantially independent of the leakage of the diode or electroluminescent cell, which not only gives a greater light output (due to the square wave), but also results in a more consistent and uniform light output which is unaffected by variations in "storage time" of the applied pulses. This is due to the fact that for any given repetition rate (within predetermined limits) a square wave having the same duty cycle will provide substantially the same light output. If a sawtooth waveform were utilized, for example, as the repetition rate varied the average voltage applied to the electroluminescent cell would also vary since the decay time (or charge time) requirement of the sawtooth waveform is assumed to be constant for all repetition rates.

A disadvantage of the above described system is that the voltage breakdown diodes will have to be fabricated with very close variations in the rated brekadown voltage. However, when purchased in large quantities, this requirement should have very little impact on the cost thereof.

While I have described above the principles of my invention in connection with specific apparatus, it is to be clearly understood that this description is made only by way of example and not as a limitation to the scope of my invention, as set forth in the accompanying claims.

What is claimed is:

1. An electroluminescent display system comprising: first and second voltage sources;

first and second conducting means arranged to form a coordinate array;

at least one electroluminescent cell coupled to said first conducting means;

a voltage breakdown diode coupled in series with said electroluminescent cell and said second conducting means for conducting current in both directions to alternately charge and discharge said electroluminescent cell; and first and second switching means for coupling respectfully said first and second voltage sources to said first and second conducting means.

2. An electroluminescent display system according to claim 1 wherein both of said voltage sources are pulse voltage sources.

3. An electroluminescent system according to claim 1 wherein said first voltage source is a source of first and second voltage and said second voltage source is a source of third and fourth voltages.

4. An electroluminescent display system according to claim 1 wherein at least one of said conducting means includes a plurality of conductors.

5. An electroluminescent display system according to claim 9 wherein said first switching means includes a first plurality of switches equal in number to said first plurality of conductors and wherein said second switching means includes a second plurality of switches equal in number to said second plurality of conductors.

6. An electroluminescent display system according to claim 1 further comprising control means coupled to said switching means for selectively operating said switching means.

7. An electroluminescent display unit according to claim 1 wherein said voltage breakdown diode is a Zener diode.

8. An electroluminescent display system according to claim 1 wherein:
said first conducting means includes a first plurality of conductors;
said second conducting means includes a second plurality of conductors; and
a plurality of crosspoints, each of which includes said electroluminescent cell in series with said voltage breakdown diode, each of said crosspoints being coupled to said first and second conducting means.

9. An electroluminescent display system according to claim 10 wherein:
said first voltage source is a source of first plurality of voltages; and
said second voltage source is a source of a second plurality of voltages.

References Cited
UNITED STATES PATENTS

| | | | |
|---|---|---|---|
| 2,774,813 | 12/1956 | Livingston | 315—169 X |
| 2,951,970 | 9/1960 | Matarese | 315—169 |
| 2,967,265 | 1/1961 | Diemer et al. | 315—169 |
| 2,988,647 | 6/1961 | Duinker et al. | 315—169 X |
| 3,371,230 | 2/1968 | Blank et al. | 315—168 X |

JOHN W. HUCKERT, Primary Examiner

A. J. JAMES, Assistant Examiner

U.S. Cl. X.R.

307—318; 315—168